Dec. 26, 1967   M. L. ABEL   3,359,614
METHOD OF MAKING OIL-IMPREGNATED WICKING MATERIAL FOR BEARINGS
Original Filed April 1, 1963   5 Sheets-Sheet 1

INVENTOR.
Martin L. Abel
BY
Lane, Aitken, Dunner & Ziems
ATTORNEYS.

Dec. 26, 1967  M. L. ABEL  3,359,614
METHOD OF MAKING OIL-IMPREGNATED WICKING MATERIAL FOR BEARINGS
Original Filed April 1, 1963  5 Sheets-Sheet 2

INVENTOR.
Martin L. Abel
BY
Lane, Aitken, Dunner + Ziems
ATTORNEYS.

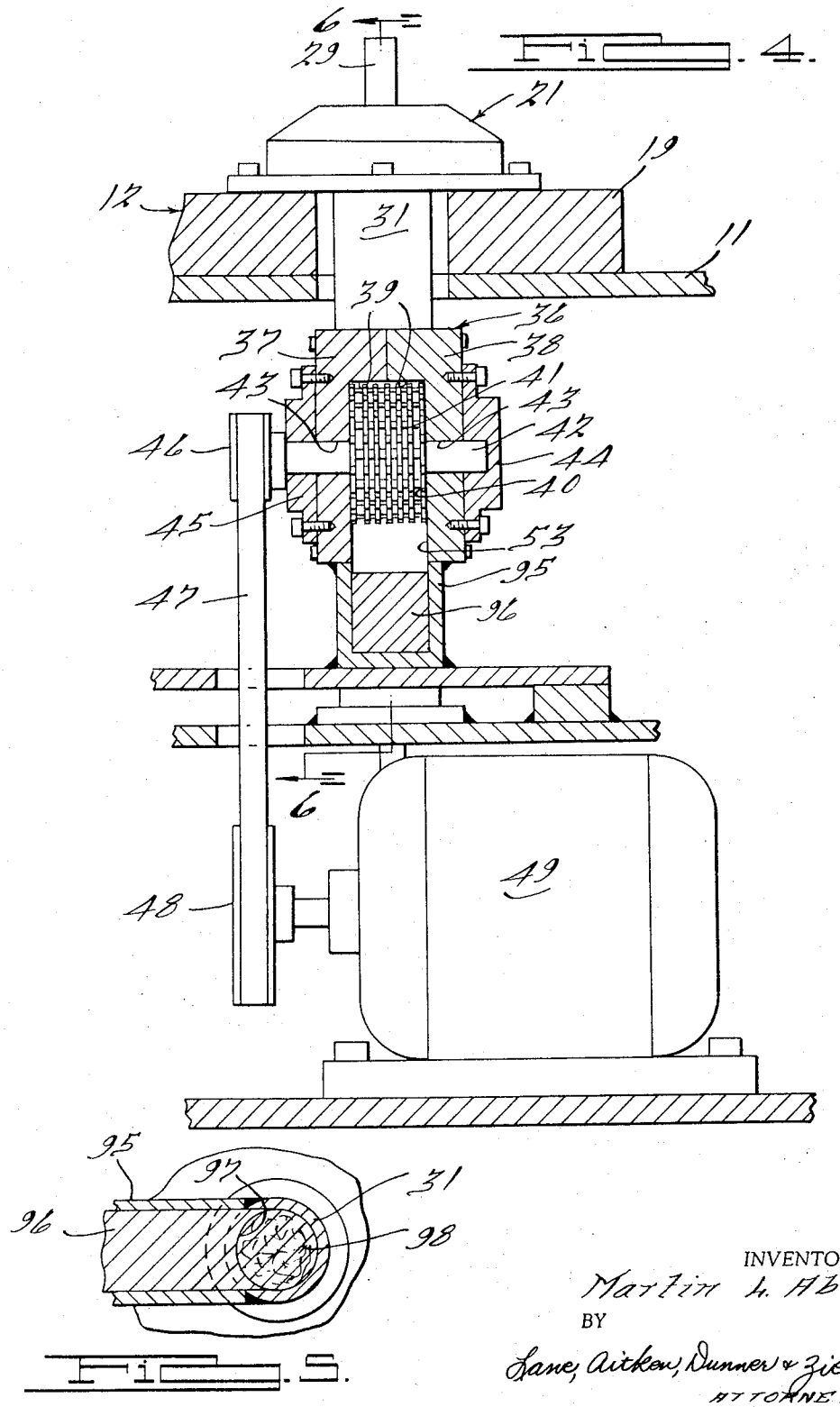

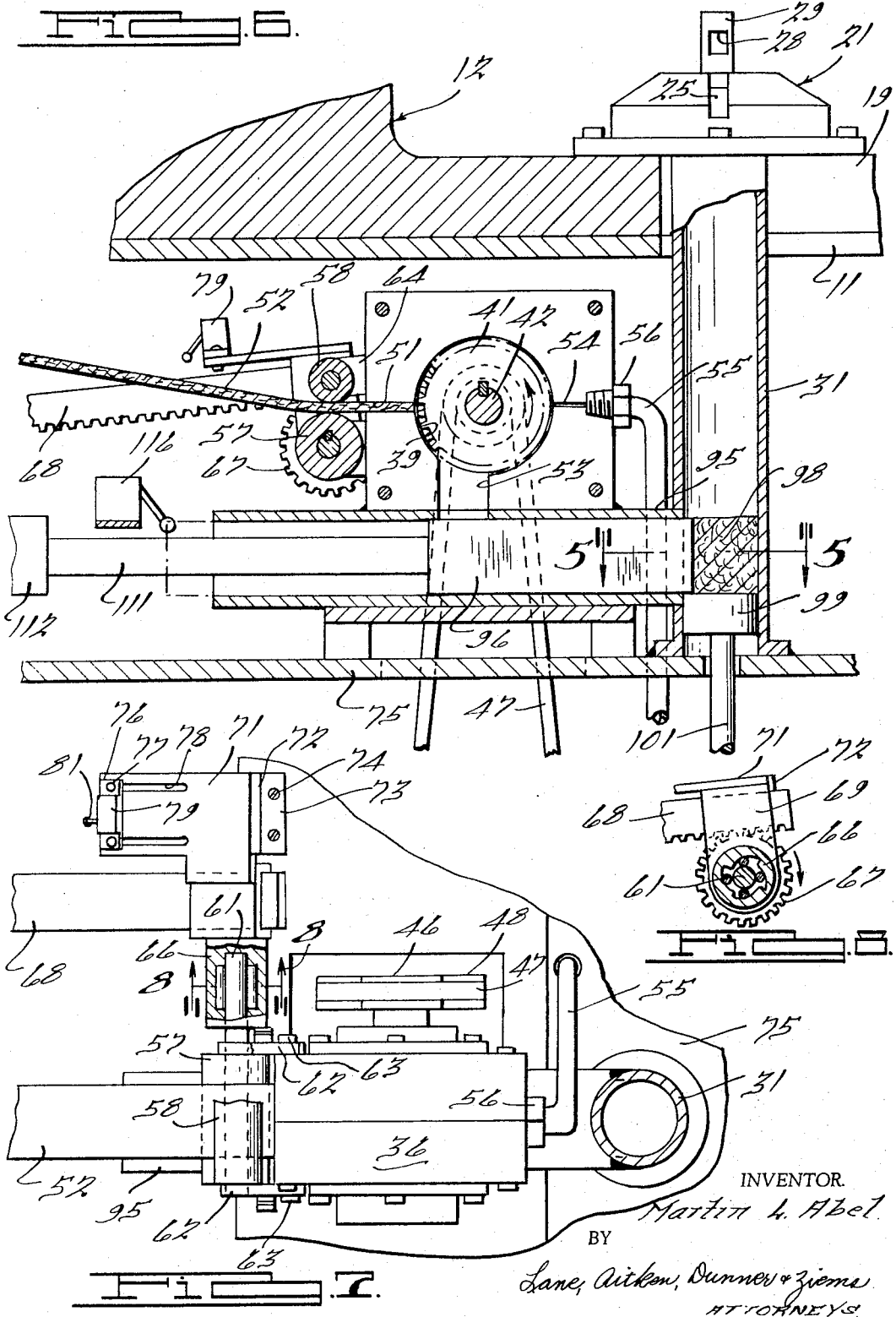

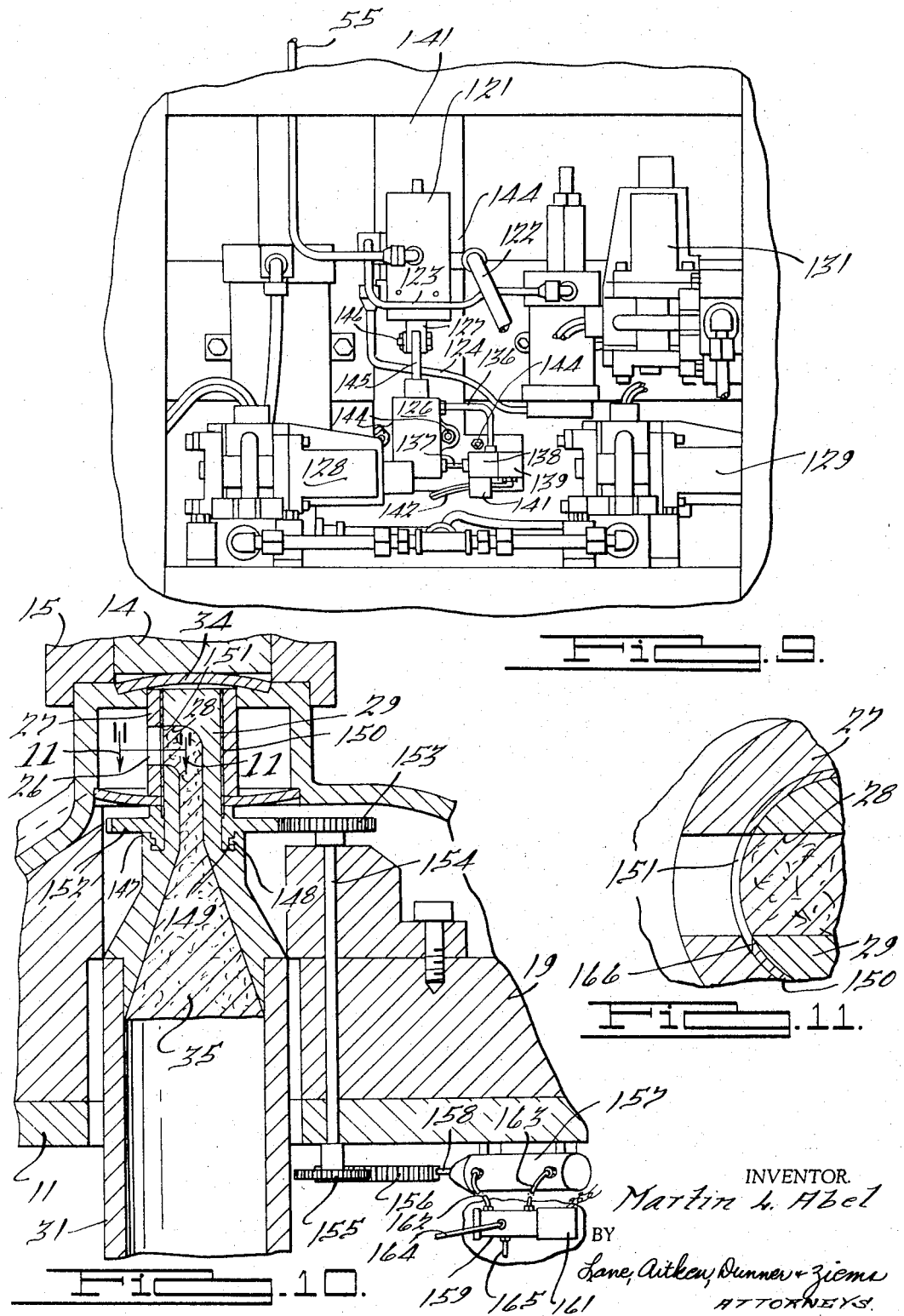

United States Patent Office 3,359,614
Patented Dec. 26, 1967

3,359,614
METHOD OF MAKING OIL-IMPREGNATED
WICKING MATERIAL FOR BEARINGS
Martin L. Abel, 14141 Balfour, Oak Park, Mich. 48237
Application Apr. 2, 1965, Ser. No. 445,084, which is a division of application Ser. No. 269,576, Apr. 1, 1963, now Patent No. 3,226,801, dated Jan. 4, 1966. Divided and this application Oct. 15, 1965, Ser. No. 521,469
5 Claims. (Cl. 29—149.5)

ABSTRACT OF THE DISCLOSURE

A method for shredding fibers from a strip of fibrous material and mixing a bearing oil with the shredded fibers for producing an oil-impregnated wicking material, which can be injected into a bearing well.

---

Cross references to related applications

This application is a division of my co-pending application Ser. No. 445,084, entitled Fiber Producing Machine Which Delivers Wicking Material Made Therefrom into a Bearing Well and the Method Therefor, filed on Apr. 2, 1965, which in turn is a division of my parent application Ser. No. 269,576 entitled, Fiber Producing Machine Which Delivers Wicking Material Made Therefrom into a Bearing Well and the Method Therefore, filed on April 1, 1963, and now Patent No. 3,226,-801 granted on Jan. 4, 1966.

This invention relates to methods for making and injecting wicking materials and particularly to a method for shredding fibers from a length of webbing material, mixing a lubricant with the fibers and delivering the mixture into a bearing well.

Packing materials of various natures have been employed in the past. These usually took the form of a waste-like material saturated with an oil which was packed about the shaft or the journal of a bearing. Various materials were used as a carrier, wool yarn, asbestos, cotton, and the like, alone or in combination. Such materials were packed with greases or oils and employed about the shaft and journals of a bearing. More recently, since the advent of sintered bearing materials, such lubricants were applied in a reservoir in rear of the bearing sleeve to feed the oil or other lubricant therethrough to the shaft. Due to the pumping condition produced by the operation of the shaft within the bearing sleeve, the oil would work toward the ends of the sleeve and slingers were employed for returning the oil to the carrier material thereby providing a bearing which required no added lubricant. A wicking material was developed from macerating wood fiber paper to obtain small fibers which received and supported at least five times by volume the oil lubricant to such tenacity that the resulting mixture could be injected into the bearing well.

In practicing the present invention a method reduces a length of webbing material back to its fiber form at the time that a wicking material was to be delivered to a bearing well. During the shredding of the webbing material, oil is injected in fine globular form onto the fibers as they were separated from the webbing strip. The shredding is produced by a cutter having peripheral teeth which passed over an aperture and the end of the webbing material as it is advanced to a peripheral area having a diameter substantially equal to that of the cutter. The shredding tool passing across the aperture adjacent to the peripheral wall pulled and released the fibers from the end of the webbing strip so that only individual fibers were present in the fluffy mixture of fibers produced thereby. While the shredding was occurring the oil in fine globular form, almost as a mist, was saturating the fibers to a desired degree so that the resulting mixture had at least five to one of the oil and fibers by volume. This mixture was collected within a cylinder and was advanced to a delivery cylinder which moved the mixed material upwardly through an aperture in the sleeve of the bearing into the well in the rear thereof. It was found in this arrangement that the fibers of cotton or wool and other materials would support the oil for the short distance of travel without a separation therebetween. The wood fibers were the only ones which could support such a ratio between the fibers and the oil when injected through metering devices and advanced over a substantial distance without losing the lubricity of the mixture. In view of the short time in which the lubricant is to be retained and the short path in which it is to travel without being metered the cotton, wool or other similar fibers were found to be adequate as a carrier for the desired amount of lubricant which must be employed to satisfactorily lubricate the shaft for the life of the device in which it operates.

The main objects of the invention are: to provide a machine for shredding fibers from the end of a strip of webbing while spraying a predetermined amount of oil thereover; to shred a predetermined amount of fibers from the end of a strip of webbing while applying a predetermined amount of a lubricant thereto and transfer the saturated fibers to a well of a bearing; to advance the end of a webbing a predetermined amount against the teeth of a shredder for producing loose fibers which are sprayed with a lubricant and delivered to a ram which moves the material into the well of a bearing; to produce a lubricating material from small lengths of wool, cotton or other fibers which will retain more than four times its weight of lubricating oil when immediately delivered into a well of a bearing; and, in general, to provide a machine and a wicking material for a bearing well which is simple in construction, positive in operation and economical of manufacture.

Other objects and features of novelty of the invention will be specifically pointed out or will become apparent when referring, for a better understanding of the invention, to the following description taken in conjunction with the accompanying drawings wherein:

FIG. 4 is an enlarged, broken sectional view of the structure illustrated in FIG. 3, taken on the line 4—4 thereof;

FIG. 5 is a broken, sectional view of the structure illustrated in FIG. 4, taken on the line 5—5 thereof;

FIG. 6 is a broken, sectional view of the structure illustrated in FIG. 5, taken on the line 6—6 thereof;

FIG. 7 is an enlarged, broken, sectional view of a structure illustrated in FIG. 3, taken on the line 7—7 thereof;

FIG. 8 is a broken, sectional view of the structure illustrated in FIG. 7, taken on the line 8—8 thereof;

FIG. 9 is a view in elevation of servo devices employed in the base of the machine illustrated in FIG. 3;

FIG. 10 is a view of structure similar to that of FIG. 2, showing another form of delivery head; and FIG. 11 is an enlarged, broken, sectional view of the structure illustrated in FIG. 10, taken on the line 11—11 thereof.

Figure 1:
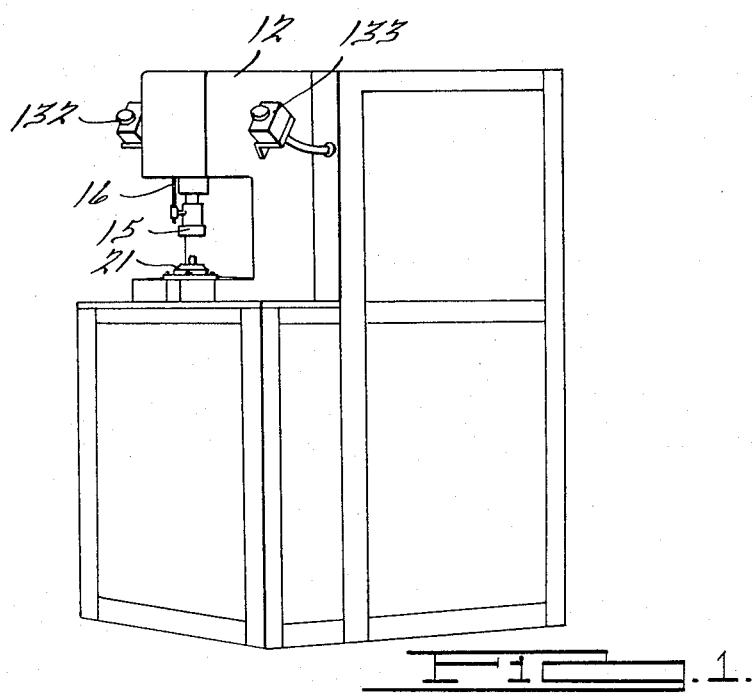
FIGURE 1 is a perspective view of a machine for making and delivering a wicking material to the well of a bearing.
Figure 2:
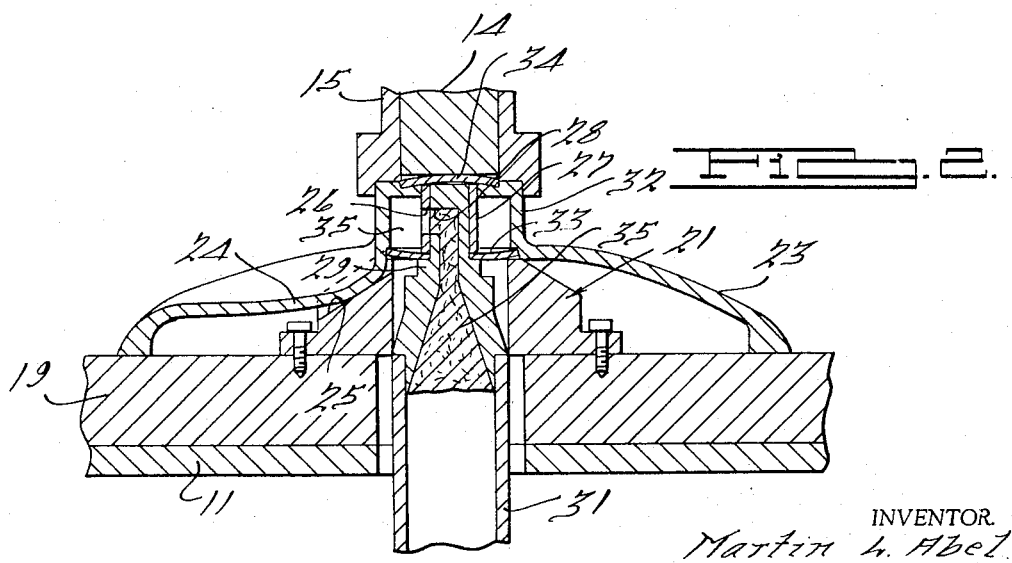
FIG. 2 is an enlarged sectional view of the delivery head of the machine illustrated in FIG. 1 with the well of a bearing disposed thereover.
Figure 3:
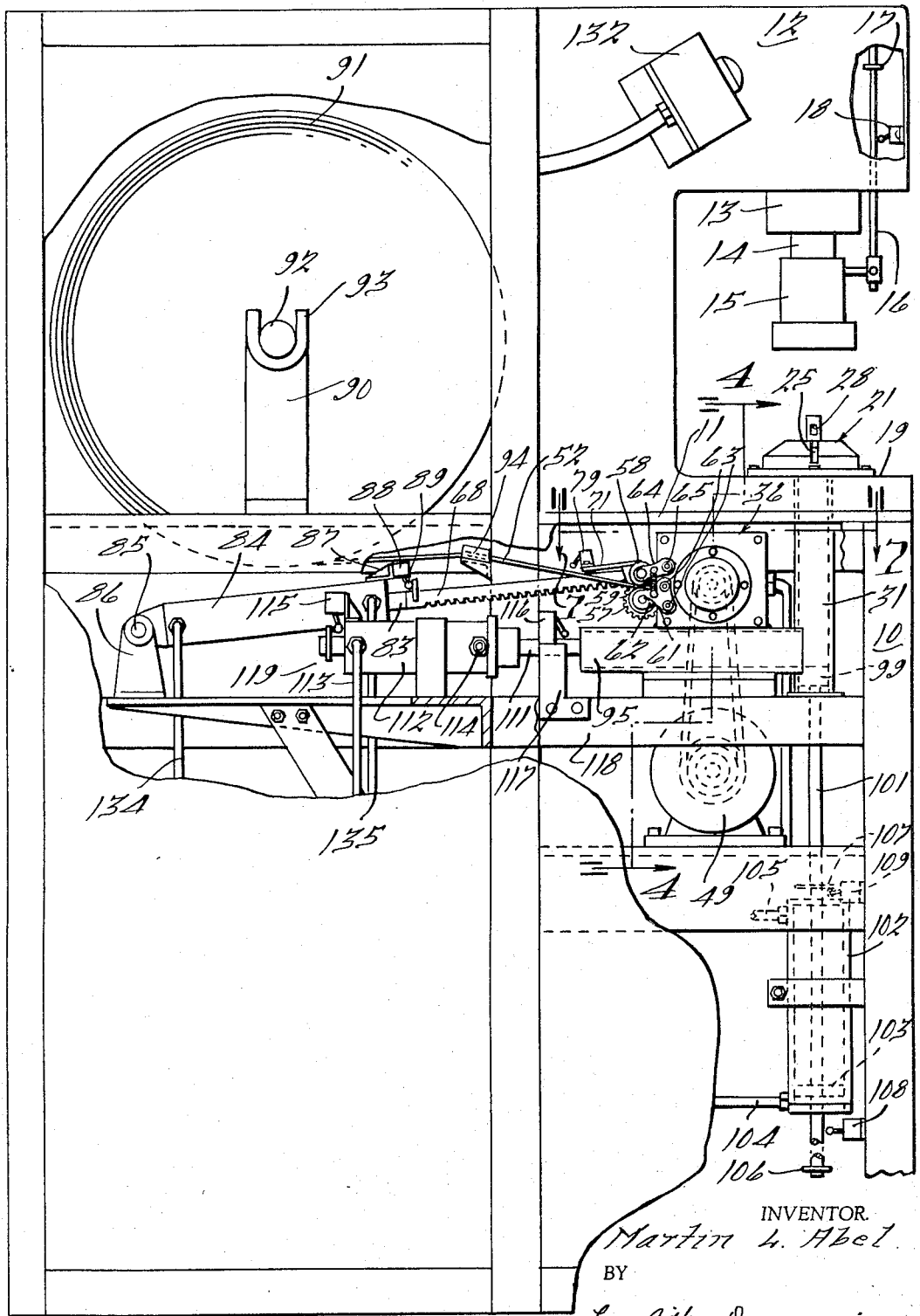
FIG. 3 is a broken sectional view of the structure illustrated in FIG. 1, as viewed from the back side thereof.

The device of the present invention embodies a base frame 10 having a top plate 11 thereon which supports a C-shaped head 12 on the front end thereof. The upper portion of the head supports a cylinder 13 having a piston rod 14 movable therefrom to advance a head 15 downwardly to clamp a bearing in predetermined position. The head 15 has an adjustable rod 16 thereon carrying an arm 17 for operating the arm of a switch 18 the contacts of which are actuated when the head 15 reaches its lowermost position. The lower extending portion 19 of the head 12 carries a fixture 21 of any desired design for locating the bearing relative to the head 15. The fixture 21, as more specifically illustrated in FIG. 2, is that for locating and positioning an end bell 23 of a fractional horsepower motor which has an inwardly extending portion 24 which fits within a slot 25 in the fixture. This locates a window 26 in a sleeve bearing 27 opposite to an opening 28 in the end of the delivery nozzle 29 provided on the upper end of a cylinder 31. The bearing is held in position within the hub 32 of the end bell 23 by a spring washer 33 and a spring disc 34. The washer 33 forms a well 35 about the bearing 32 for receiving the wicking material. The piston 14 is recessed from the end of the head 15 and is preferably magnetized so as to support the medallion disc 34 which is placed therein by the operator before the head 15 is lowered. This is done for the purpose of applying the disc to the end of the hub 32 at the time the head 15 engages the end of the hub and accurately locates the end bell 23 on the fixture.

The wicking material 35 is made in the device 36 located in the base of the machine below the plate 11 and head 12. The device 36 embodies a pair of plates 37 and 38 having aligned cylindrical recesses 39 therein facing each other to form a chamber 40 for a shredder 41. The shredder is fixed on a shaft 42 which is journaled in apertures 43 centrally of the recesses 39. The right hand end of the shaft 42, as illustrated in FIG. 4, is enclosed by a cap 44 while the opposite end extends through an aperture in a cap 45. A pulley 46 is secured to the left hand end of the shaft as illustrated in FIG. 4, and driven by a belt 47 from a pulley 48 on the shaft of a motor 49.

A radial slot 51 extends through the left hand end of the plates 37 and 38 as illustrated in FIG. 5, through which a continuous length of fibrous webbing 52 is advanced a predetermined amount during each delivery operation. It will be noted that the teeth of the shredder 41 are directly adjacent to the peripheral surface of the chamber 40 so that the end of the length of the webbing material will be radially directed against the teeth and will not be drawn downwardly across the surface. This permits the teeth of the cutter to loosen and pull the fibers from the webbing material which are directed into an aperture 53 which communicates with the chamber 40 at the left hand side of a vertical diameter thereof. An aperture 54 of small diameter extends into the chamber 40 at some point on the periphery thereof, therein illustrated as being disposed directly opposite to the slot 51. A conduit 55 is connected by a suitable fitting 56 to the aperture 54. A predetermined amount of oil in fine globular or mist form is produced by the impingement of the oil under pressure as it is delivered against the teeth of the shredder 41 within the chamber 40. A predetermined amount of oil is injected into the chamber at the time a predetermined amount of fibers are produced from the end of the webbing material 52 to form a charge of wicking material each time a prior formed charge is delivered into a bearing well.

The length of webbing material is fed between a driving roller 57 and a follower roller 58 which is urged against the lengths of webbing material and toward the roller 57 by a pair of springs 59. The driving roller is carried on a shaft 61 by a pair of brackets 62 which is secured to the sides of the plates 37 and 38 by screws 63. The follower roller 58 is supported on a shaft on a pair of arms 62 which are pivotally secured to the plates 37 and 38 by screws 65. The shaft 61 is connected to an overrunning clutch 66 which is driven by a pinion 67 from a rack 68. It is to be understood that the roller 57 may have its peripheral surface knurled or otherwise roughened to produce a positive drive to the length of the webbing material. Preferably the length of the webbing material is formed of garnetted fibers, the layers of which are folded over a number of times to produce a desired thickness to the strip.

A bracket 69 is mounted about the pinion 67 for guiding the forward end of the rack 68 and for supporting a plate 71 which has a flange 72 extending downwardly with its end bent outwardly at 73 and secured by screws 74 to a supporting plate 75. The plate 71 supports a plate 76 having screws 77 extending through slots 78 by which the plate 76 may be adjusted on the plate 71 to various positions over a substantial length thereof. The plate 76 supports a switch 79 in position to have its actuating arm 81 engaged by an arm 82 on the rack 68 when in advanced position. The arm 82 is of sufficient height to pass over the plate 71 and to contact the arm 81 in any of its positions thereabove.

The rack is supported on a piston rod 83 which extends from a piston in a cylinder 84, the rear end of which is mounted on a stub shaft 85 extending through bosses of a bracket 86. The forward end of the cylinder carries a bracket 87 on which a switch 88 is mounted, having an actuating arm 89 extending in the path of the arm 82 which also actuates the arm on the switch 79. The switches 79 and 88 control the length of movement of the rack 68 and thereby the length of the webbing material which is fed against the teeth of the cutter 41. The amount of fibers which are treated each operation is controlled by the position of the switch 79 which may be adjusted a substantial amount on the plate 71. The webbing material is furnished on rolls 91 having a shaft 92 extending through the center and disposed in cradles 93 on uprights 90 which are supported on the plate 11. The webbing is fed through a rectangular tube 94 which guides the strip to the rollers 57 and 58.

The oil-laden fibers fall through the aperture 53 into a square cylinder 95 having a square piston 96 therein. The cylinder and piston are horizontally disposed and communicate with the vertical disposed cylinder 31. The front end of the piston has an arcuate surface struck on the center of the cylinder 31 so as to complete the wall thereof after the piston 96 has advanced to its forward position, as illustrated in FIG. 6. This advances the charge 98 of the wicking material into the cylinder 31 above the piston 99 thereof. The piston is supported on a piston rod 101 which extends from a cylinder 102 connected to a piston 103 disposed within the cylinder. Conduits 104 and 105 are connected to the wall of the cylinder at the opposite ends thereof. The rod has washers 106 and 107 thereon which actuates the arms of switches 108 and 109 disposed in the path of movement of the washers.

The piston 96 is connected by a piston rod 111 to a piston within the cylinder 112 which has conduits 113 and 114 connected to the opposite ends thereof. A switch 115 is mounted on the rear end of the cylinder 112 and a switch 116 is mounted on a bracket 117 attached to one end of the cylinder. The operating arm of the switch 116 is in the path of movement of the piston 96 which actuates the arm and operate the switch when the piston is in retracted position. In the forward position of the rod 111 a washer 119 mounted adjacent to the rear end thereof actuates the arm of the switch 115 when the piston 96 is in forward position.

As illustrated in FIG. 9, a 4-way valve 121 has an intake conduit 122 for the oil supply and the outlet conduit 55 connected thereto the latter of which is connected to the fitting 56 to supply oil through the aperture 54 to the chamber 40. Conduits 123 and 124 are connected between the 4-way valve 121 and a metering valve 125. The oil passing through the conduit 123 moves the piston of the metering valve to deliver the metered amount of oil therefrom to the conduit 124, the valve 121 and to the conduit 55 to the passageway 54 and chamber 40. Upon the reverse movement of the valve 121 fluid is advanced through the conduit 124 to move the piston of the metering valve 125 upwardly to force the metered amount of oil thereabove through the conduit 123, to valve 121, conduit 55, aperture 54 into the chamber 40. A fluid operated cylinder 126 operates the spool 127 of the 4-way valve each time it is operated in one or the other direction. Solenoid operated valves 128, 129 and 131 control the delivery of oil to and from the cylinders 31, 84 and 112 in the sequence of operation of the various switches. A pair of switches 132 and 133 at each side of the C head 12 must be actuated by both hands to the operator to initiate an operation.

When operating the machine, the operator first places the end bell 23 in proper position upon the fixture 21 and over the nozzle end of the cylinder 31 with the discharge aperture 28 aligned with the window 26 in the sleeve bearing 27 located by the inwardly projecting portion 24 of the end bell within the aperture 25 of the fixture. Thereafter the medallion disc 34 is applied to the end of the piston rod 14 and both of the switches 132 and 133 are actuated by both of the hands of the operator. This energizes one of the solenoid valves which supplies oil to the bottom end of the cylinder 102 beneath the piston 103 which is advanced thereby to move the piston 99 in the cylinder 31 upwardly therein to carry the charge of wicking material 98 upwardly therein and force the remaining portion 35 of the prior charge out through the opening 28 and through the opening 26 of the bushing into the well 35. At the end of the upward movement, the washer 106 strikes the arm of the switch 108 and actuates it to operate the solenoid valve 128 to its initial position which reverses the flow of oil in the conduit 104 and directs oil through the conduit 105 above the piston 103 in the cylinder 102, thereby retracting the rod 101 and the piston 95 to its initial position. The washer 107 strikes the arm of the switch 109 and energizes the solenoid operated valve 129 to its initial position directing oil through the conduit 114 to the forward end of the cylinder 112 to reverse the movement of the piston rod 111 and to retract the piston 96. At the end of the piston movement the arm of the switch 116 is actuated to close the switch and thereby energize the solenoid 131 which directs fluid through the conduit 134 in the rear end of the piston in the cylinder 84 to advance the rod 83 and rack 68 to advance a predetermined length of the webbing material 52 to the teeth of the shredder 41. At the same time the solenoid 126 is energized to shift the 4-way valve 121 and thereby cause the delivery of a predetermined amount of oil through the passageway 54 to the chamber 40. When the arm 82 strikes the arm 81 of the switch 79, the valve 131 is reversed and fluid is directed through a conduit 135 at the forward end of a cylinder 84 to retract the piston rod 83 and the rack 68 which does not drive the shaft 61 in view of the presence of the overrunning clutch 66.

The cylinder 126 has the fluid which is oil or the like, directed to either end of the cylinder by conduits 136 and 137 from a valve 138 which is controlled by a solenoid 139. A holding relay 141 is in the circuit 142 to the solenoid 139 which produces the operation of valve 138 in each cycle of operation of the machine. Upon the forward advancement of the rack 68 the switch 88 has its contacts closed which energizes the solenoid 139 to operate the valve 138 to cause the piston to move to the opposite end of the cylinder 126. This produces an injection of the oil through the 4-way valve 121 from either one of the conduits 123 or 124 to the conduit 55. The holding relay 141 secures the circuit closed which is retained closed until the switch 88 has its contacts open upon the return movement of the rack 68. The next forward movement of the rack 68 closing the contacts of switch 88 will produce the energization of the solenoid 139 and the operation of the valve 138 which returns the piston to the opposite end of the cylinder thereby producing a flow of fluid from the metering valve 125 through the 4-way valve 121 to the conduit 55. Again the holding relay 141 maintains the circuit closed which will not be open until the return movement of the rack 68 which opens the contacts of the switch 88. In this manner oil is supplied to the chamber 40 each cycle of operation of the machine from one or the other end of the metering valve 125 through one or the other of conduits 123 or 124 through the 4-way valve 121 to the conduit 55. The 4-way valve 121, the cylinder 126 and the solenoid valve 138 are supported on a plate 143 by bolts 144. A piston rod 145 extends from the cylinder 126 and is connected by a bolt 146 to the spool 127 of the valve 121.

Referring to FIGURE 10, a further form of the invention is illustrated that wherein a blade is employed for severing the fibers between the bearing and delivering head upon the completion of the delivery operation of the wicking material to the well of the end bell. Since the wicking material may have long fibers therein, it is desirable to sever the fibers before the end bell is removed from the delivery head. The wicking material is entirely different from that which must support the oil when passing through an injection machine which meters a charge of wicking material from the main supply and injects it into the well of a bearing. It was found that extremely small wood pulp paper fibers were required to produce a material which would withstand the metering and injection operations. The wicking material produced by the machine of the present invention is made from medium lengths of fibers whether of cotton, wools, synthetic or of any other type since the metering of a charge from a main supply is not required. In view of the fact that the shredding operation does nothing but reduce the webbing material back to the fiber form of a size from which the webbing material was made, various lengths of the fibers will be present. Difficulty was experienced when removing the bell end from the delivery head when long fibers extended through the openings thereof.

To overcome this difficulty, the delivery head 29 has a cutting cylinder 150 thereabout containing a window 151 which is normally aligned with the window 28 of the delivery head. The cylinder is made of extremely thin steel, such as the thinness of a Gillette safety razor blade, and the edge of the window 151 which is to be advanced across the opening 28 of the head may be sharpened to have a cutting edge therealong. The cylinder 150 is welded or otherwise secured to a pinion gear 152, the lower portion of the hub of which has external slots 149 extending over two diametrically disposed 90° sectors by having the bottom side wall cut away thereat, two diametrically disposed arcuate flanges 148 extend inwardly from an annular flange 147 on the top of the cylinder 31 below the delivery head 29. The sectors permit the interfilling of the flanges 147 with the slots 149 and the rotation thereafter into complete engagement when the windows 26 and 28 are in aligned relation. This interlocking of the flanges in the slots retains the gear 152 in position about the head 29 when the end bell is being removed. The gear 152 mates with a pinion gear 153 mounted on a shaft 154 in driving relation thereto. Below the plate 11 the shaft has a driving pinion gear 155 thereon with its teeth in engagement with the teeth of a rack 156 which is advanced and retracted by a piston in a cylinder 157 which is connected to a rod 158 attached to the end of the rack 156. A valve 159 is actuated by a solenoid 161 for controlling the passage of fluid to and from conduits 162 and 163 for moving the piston to one or the other end of cylinder 157 in the conventional manner. A conduit 164 delivers fluid under pressure to the valve while a conduit 165 delivers fluid back to tank.

At the end of the upward stroke of the piston 99 within the cylinder 31, the solenoid 161 is energized to advance the rack 156 and thereby drive the pinion gears 155, 153 and 152 to rotate the cylinder 150 to have the cutting edge of the window 151 pass across the window 28 requiring an arcuate movement of approximately 30° of rotation. Upon the return movement of the piston 99, the solenoid 161 is deenergized to have the spring pressed valve 159 return to its initial position thereby returning the rack 156 to its initial position with the window 151 aligned with the window 28. Any fibers extending between the window 28 of the delivery head 29 and the window 26 of the sleeve bearing 27 will be severed by the cutting edge of the window 151 as it is rotated between the delivery head and the sleeve. The sloping cutting edge is beveled toward the inside of the cylinder 150 so that the sloping surface 166 will pack the severed wicking material in the opening 26 of the sleeve bearing 27. The retention of oil by the fibers is not critical when a single charge of wicking material is manufactured each time a charge is delivered to the bearing well. Sufficient oil will always be present in the material, the amount of which can be changed in the manner indicated hereinabove. An oil having a viscosity corresponding to SAE numbers from 10 to 60 can be satisfactorily carried by the fibers and delivered to the well of the bearing. Therefore, neither the length of the fibers or the lubricating oil, whether of vegetable, animal or mineral origin, are critical for the forming of a charge by the machine and for delivering it directly to the well of the bearing. The only difficulty which may be encountered would be of fibers of too great a length which would be pulled from the well or the head. This difficulty has been overcome by the use of the cylindrical cutter above described with regard to the structure of FIG. 10.

When the word shredding is employed in the specification and claims, it is to be understood that the operation covers the separation of the fibers from the webbing strip and not the chopping of fibers to produce smaller lengths thereof. The operation reproduces the fibers as separate elements of substantially the same length and form which they had at the time the garnetting or other process was employed to produce the webbing strip from the fibers.

What is claimed is:

1. A method of making oil-impregnated wicking material for lubricating bearings, which includes the steps of, shredding an oil-retaining fibrous material comprising small fibers mated together in a manner to break down the material substantially to the fibers from which the material was formed, and mixing a bearing oil with said shredded fibers to form an oil-impregnated wicking material which can be injected into bearing wells, the weight of the bearing oil in said oil-impregnated wicking material being several times the weight of said shredded fibers.

2. A method recited in claim 1 wherein said mixing step comprises exposing said shredded fibers to a spray of said bearing oil, and collecting the oil-impregnated fibers after they have been exposed to the oil spray.

3. A method as recited in claim 1 wherein said mixing step comprises mixing with said shredded fibers as they are being shredded a bearing oil having a viscosity corresponding to SAE numbers 10–60, and controlling the mixing of oil and shredded fibers to produce a mixture at least four parts oil by weight to one part shredded fibers by weight.

4. A method as recited in claim 1, wherein said small fibers are wool fibers.

5. A method as recited in claim 1, wherein said mixing step comprises spraying oil into a moving stream of said shredded fibers, and collecting the oil-impregnated fibers.

References Cited
UNITED STATES PATENTS

| | | | |
|---|---|---|---|
| 588,340 | 8/1897 | Kemp | 241—38 |
| 1,207,069 | 12/1916 | Park | 241—38 |
| 2,079,094 | 5/1937 | Whitehead et al. | 19—66 |
| 2,229,566 | 1/1941 | Hill et al. | 19—66 |
| 2,501,979 | 3/1950 | Wood et al. | 19—66 XR |
| 2,584,771 | 2/1952 | Wilkinson | 29—422 XR |

THOMAS H. EAGER, *Primary Examiner.*